United States Patent
Poli et al.

(10) Patent No.: US 6,904,611 B1
(45) Date of Patent: Jun. 7, 2005

(54) METHOD AND SYSTEM FOR DIRECTING THE DOWNLOAD OF SOFTWARE AND FIRMWARE OBJECTS OVER A NETWORK SUCH AS A CABLE TELEVISION SYSTEM

(75) Inventors: Christopher Poli, Doylestown, PA (US); Christopher S. Del Sordo, Souderton, PA (US); Douglas S. Makofka, Willow Grove, PA (US); Jack Birnbaum, Southampton, PA (US); Thomas F. Bates IV, Richboro, PA (US); Dave Prezuhy, Chalfont, PA (US); Ira S. Lehrman, West Windsor, NJ (US)

(73) Assignee: General Instrument Corporation, Horsham, PA (US)

(*) Notice: Subject to any disclaimer, the term of this patent is extended or adjusted under 35 U.S.C. 154(b) by 693 days.

(21) Appl. No.: 09/621,516

(22) Filed: Jul. 21, 2000

Related U.S. Application Data (60) Provisional application No. 60/152,286, filed on Sep. 3, 1999.

(51) Int. Cl.⁷ .............................................. H04N 7/173
(52) U.S. Cl. .................................... 725/132; 725/139
(58) Field of Search ............................... 725/131–132, 725/139, 140, 151, 152

(56) References Cited

U.S. PATENT DOCUMENTS

| | | | |
|---|---|---|---|
| 5,003,591 A | * | 3/1991 | Kauffman et al. .......... 380/232 |
| 5,420,866 A | | 5/1995 | Wasilewski |
| 5,440,632 A | | 8/1995 | Bacon et al. |
| 5,666,293 A | * | 9/1997 | Metz et al. ................ 709/220 |
| 5,734,822 A | * | 3/1998 | Houha et al. ............... 717/167 |
| 5,818,935 A | | 10/1998 | Maa |
| 5,852,290 A | | 12/1998 | Chaney |
| 5,951,639 A | * | 9/1999 | MacInnis ..................... 725/70 |
| 6,256,393 B1 | * | 7/2001 | Safadi et al. ............... 380/232 |
| 6,266,810 B1 | * | 7/2001 | Tanaka et al. .............. 717/173 |
| 6,374,405 B1 | * | 4/2002 | Willard ....................... 725/94 |
| 6,718,374 B1 | * | 4/2004 | Del Sordo et al. .......... 709/220 |

FOREIGN PATENT DOCUMENTS

| | | |
|---|---|---|
| EP | 0399200 | 11/1990 |
| EP | 0848341 A2 | 6/1998 |
| EP | 0905984 A2 | 3/1999 |
| EP | 0907285 A1 | 4/1999 |
| WO | WO 97/30549 | 8/1997 |

OTHER PUBLICATIONS

Advanced Television Enhancement Forum Specification, Draft Version 1.1r26 updated Feb. 2, 1999.*

International Preliminary Examination Report, dated Dec. 6, 2001.

Written Opinion from International Preliminary Examination Authority, dated Jul. 24, 2001.

* cited by examiner

*Primary Examiner*—John Miller
*Assistant Examiner*—Scott Beliveau
(74) *Attorney, Agent, or Firm*—Steven L. Nichols; Ronald P. Kananen; Rader, Fishman & Grauer PLLC

(57) ABSTRACT

A Download Control Message instructs a set-top terminal in a cable television system to located and immediately begin downloading a code or other data object available over the cable system. The Download Control Message specifies, for example, the size, name, version and location (URL or transport stream and PID) of the object to be acquired by the set-top terminal. The terminal accordingly can begin immediate acquisition of the object. An address or other characteristic associated with the Download Control Message allows the system operator to target the Message to a particular set-top terminal or group of terminals.

2 Claims, 4 Drawing Sheets

METHOD AND SYSTEM FOR DIRECTING THE DOWNLOAD OF SOFTWARE AND FIRMWARE OBJECTS OVER A NETWORK SUCH AS A CABLE TELEVISION SYSTEM

This application claims the benefit of U.S. Provisional Application(s) No(s).: 60/152,286 filed Sep. 3, 1999.

FIELD OF THE INVENTION

The present invention relates to the field of programming a set-top terminal of a cable television system, particularly upgrading or expanding the software or firmware in the set-top terminal. More particularly, the present invention relates to the field of directing individual terminals or a group of terminals to acquire a new or upgraded programming object or list of objects over the cable television system.

BACKGROUND OF THE INVENTION

In a typical cable television system, subscribers are provided with a set-top box or terminal. The set-top terminal is a box of electronic equipment that is used to connect the subscriber's television, and potentially other electronic equipment, with the cable network. The set-top box is usually connected to the cable network through a co-axial wall outlet.

The set-top box is essentially a computer that is programmed to process the signals from the cable network so as to provide the subscriber with the cable services. These services from the cable television company typically include access to a number of television channels. Additional, premium channels may also be provided to subscribers at an additional fee. Pay-per-view events may also be provided over the cable network. The set-top box is programmed to provide these services to subscriber.

However, the services of the cable company need not be limited to providing television programming. Some cable companies are now offering internet access and e-mail over the cable network at speeds much faster than are available over conventional telephone lines. It is anticipated in the future that more and more services will be commonly provided over cable networks, including video-on-demand and even basic telephone service. Eventually, each home or office may have a single connection, via the cable network, to all electronic data services.

As the cable network and the services provided evolve, the set-top terminal must also evolve to be able to provide subscribers with all the services of the cable network. This set-top box evolution will primarily involve changes to the programming of the set-top box. By upgrading the software or firmware of the set-top box, the box can be made to perform more efficiently or offer new services as the cable network evolves.

In order to upgrade the population of set-top boxes on a cable network, it is preferable to transmit the new programming to the set-top boxes via the cable network itself. Otherwise, a technician must visit each subscriber to upgrade the set-top boxes. Such field upgrades would obviously be at significant expense to the system operator.

The headend is the facility from which the cable network operator broadcasts television signals and provides other services over the cable network. Updated software that is provided to the population of set-top terminals can be broadcast from the headend over the cable network. Messages giving instructions or information to the set-top terminals can also be broadcast from the headend. Messages and programming are routinely broadcast by the headend over the cable network.

These messages and programming are typically "packetized," meaning that the data of the message or the software or firmware is divided into discrete "packets" or segments of data. Each packet includes a header that identifies the message or object of which that packet is a part and identifies the position of that packet's data within that message or object. Consequently, the set-top terminal can collect the packets of the message or object it is trying to acquire and reassemble the packetized data into the message or object sent by the headend. The packets of each data object being transmitted bear a unique packet identifier (PID), typically a number, or other identifier within the PID stream that identifies the packets as belonging to a particular data object being transmitted.

With transmitted data objects being packetized, numerous data objects can be broadcast simultaneously by interspersing or "carouseling" the packets of the various objects being transmitted. The packets of each object may be continuously transmitted and retransmitted for a period of time to give set-top terminals a continuing opportunity to acquire the object. These streams of data packets can be sent on both in-band and out-of-band (OOB) channels of the cable signal sent from the headend to the set-top terminals.

Conventionally, the first packet of each object being transmitted, designated as segment 0 (zero), contains information about the size and nature of the packetized object which is necessary for the set-top terminal to acquire and use before downloading and reconstructing the object. Consequently, under conventional protocols, the set-top terminal waits to receive segment 0 of the object it is trying to acquire before commencing the actual downloading of the object itself. As a result, segment 0 may be retransmitted by the headend more frequently than the other segments or packets of the data object so as to more readily provide the set-top terminal with the data necessary to begin a download of the object.

As noted, the system operator will periodically need to upgrade the programming of the set-top terminals to accommodate upgrades or additional services offered within the system as the system evolves. In some cases, newer set-top terminals may be placed in service ready to accommodate the latest system services and protocols and only older terminals may need to be re-programmed. Thus, it is important for the headend to be able to direct specific terminals, or an identified group of terminals, to download and implement new programming.

In previous systems, it has been difficult for the headend to order set-top terminals to download and implement new programming. Under conventional system protocols, the headend has been required to send multiple messages to the set-top terminals in order to specify the identity of an object that set-top terminals are to download and provide the instruction to acquire the object. The set-top terminal then, using standard protocols, searches the incoming control channels and datastreams from the headend for the stream containing the identified object to be downloaded. Once the appropriate datastream for the object is located, the set-top terminal must wait for segment 0 of the object and the information that segment 0 contains before downloading of the object begins. Additional signaling from the headend is required to authorize and enable the set-top terminal to implement the new programming.

Consequently, there is a need in the art for an improved system of managing the programming in a population of set-top terminals in a cable television system. Specifically, there is a need in the art for a simplified and improved method and system with which a headend facility can direct set-top terminals to download and implement specified programming code objects.

SUMMARY OF THE PRESENT INVENTION

The present invention meets the above-identified need and others. Specifically, it is an object of the present invention to provide a method and system by which a headend facility can easily direct set-top terminals to download and implement specified programming code objects.

In summary, the present invention provides a new protocol, including a single message that can be sent from the headend to set-top terminals to cause those terminals to instantly acquire and implement new programming being offered over the cable network. The new message provides all the information needed by the set-top terminal to instantly begin acquisition of the specified object. For example, the message will identify the object, identify the control channel and PD or URL at which the object can be downloaded by the set-top terminal and provide the information about the object that was formerly provided in segment 0 so that the set-top terminal need not wait for segment 0 to begin acquisition of the object. The new message of the present invention can also provide all the information necessary to enable the set-top terminal to authenticate and implement the new object.

More specifically, the present invention may be embodied and described as a method of controlling the downloading of code and data objects by a set-top terminal in a cable television system by transmitting a download control message to the set-top terminal, where the download control message specifies an object to be downloaded, the size of the object and the location of the object such that the set-top terminal is enabled to commence downloading the object upon receipt of the download control message. In other words, no other information is necessary to allow the terminal to begin acquiring the designated object. The download control message of the present invention may be embedded in an entitlement management message that is routinely transmitted from a headend facility to the set-top terminal.

The location of the object may be specified by the download control message by identifying a channel with a transport stream on which the object is transmitted and a packet identifier identifying the data packets of the object within that transport stream. Alternatively, the location of the object may be specified by the download control message by listing a URL at which the object is stored.

The object specified may be a programming code object for execution by the set-top terminal. Following receipt of the download control message, the method of the present invention next includes downloading the specified code object in accordance with the download control message.

Preferably, the download control message further specifies an entitlement control data structure associated with the programming code object being acquired. In this case, the method of the present invention further includes downloading the specified entitlement control data structure in accordance with the download control message. After the code object and entitlement control data structure are acquired, the object is authenticated and authorized using the downloaded entitlement control data structure.

During the downloading of the object specified by the download control message, a system glitch or system operator action may interrupt the download. Consequently, the method of the present invention includes terminating the download if a timer exceeds a set limit prior to receipt of a next successive data packet of the object being downloaded.

The method of the present invention also preferably includes specifying, with the download control message, an operating environment of the set-top terminal in which the terminal is to respond to the download control message, i.e., is the terminal running and controlled by a platform object or a system object. According to the present invention, downloading of the object specified by the download control message will only proceed if the set-top terminal is in the operating environment specified by the download control message.

Finally, the method of the present invention further includes specifying with the download control message an address or characteristic of the set-top terminal. Consequently, downloading the specified object in accordance with the download control message is performed only if the set-top terminal bears an address or characteristic matching the address or characteristic specified in the download control message.

The present invention also encompasses a corresponding system for controlling the downloading of code and data objects by a set-top terminal in a cable television system. The system includes a set-top terminal connected to a cable television system; and means for transmitting a download control message to the set-top terminal. As above, the download control message specifies an object to be downloaded, a size of the object and a location of the object such that the set-top terminal is enabled to commence downloading the object upon receipt of the download control message.

BRIEF DESCRIPTION OF THE DRAWINGS

The drawings are a part of the specification and may be used to better understand the present invention. In the drawings.

DETAILED DESCRIPTION OF THE INVENTION

According to the present invention a new protocol is defined including a message for directing and enabling a set-top terminal or group of terminals to instantly download and implement a software or firmware object or group of objects. As will be described in detail below, this Download Control Message contains all the information necessary to allow the set-top terminal to instantly begin acquiring the specified object or group of objects. Preferably, the Download Control Message of the present invention is transmitted as a subcommand within the Entitlement Management Message (EMM) which is routinely communicated between the headend and the set-top terminals.

Figure 1:
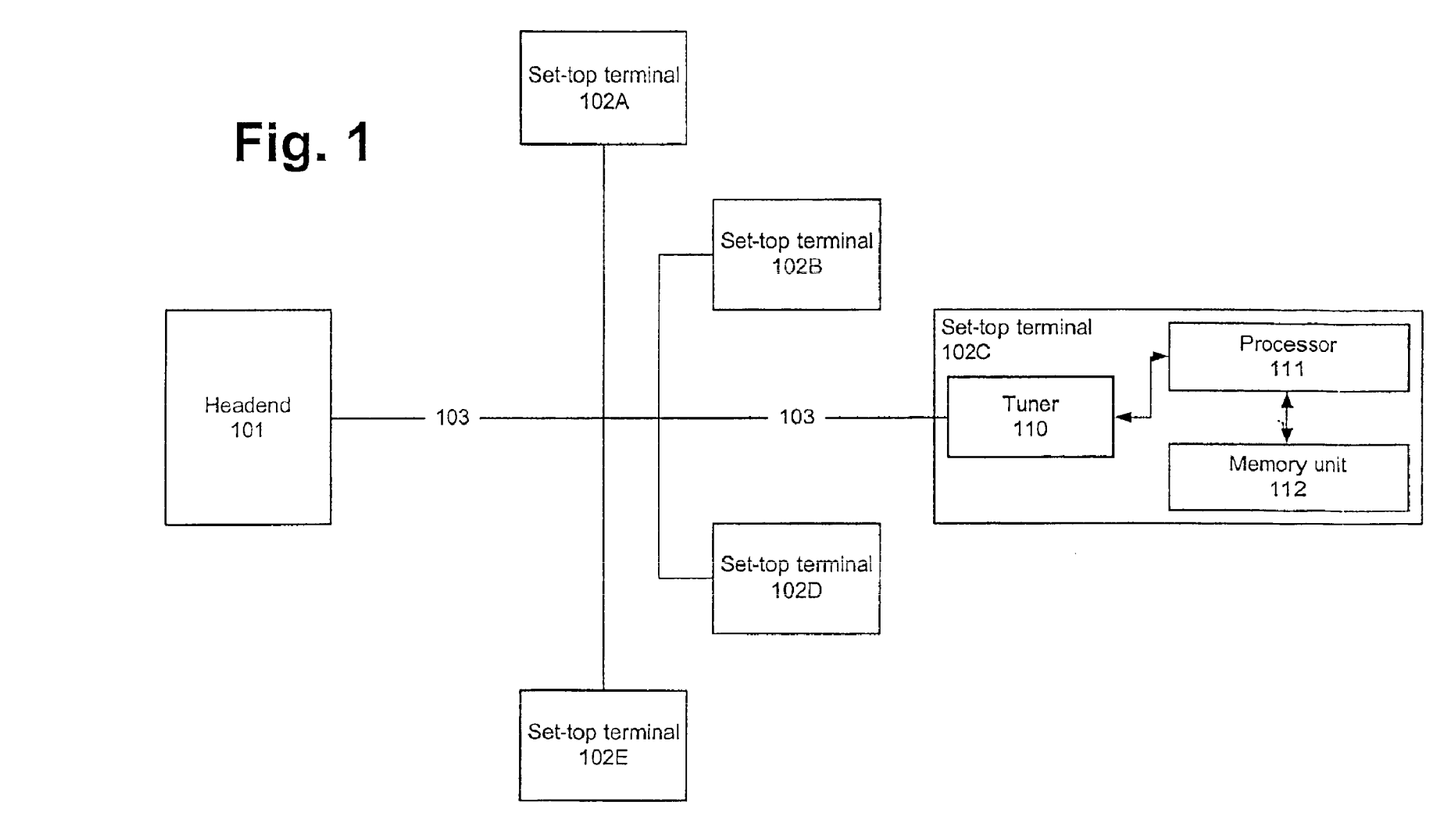
FIG. 1 is a block diagram of a cable network including a headend and population of set-top terminals with which the present invention is practiced.

As shown in FIG. 1, the headend facility (101) is connected via a cable network (103) to a population of set-top terminals (102). Each set-top terminal (102) is possessed and used by a particular subscriber to the cable service. Each set-top terminal (102) is programmed to provide those services available over the cable service that the subscriber has paid to receive.

In addition to providing services, such as a cable television signal, the headend (101) can also transmit code and data objects to the set-top terminals (102) over the cable network. In the event that changes to the system (103) or the services offered require the set-top terminals (102) to receive additional or upgraded programming, the headend (101) can transmit the Download Control Message of the present invention to cause the terminals (102) to download the new programming which is broadcast over the cable network (103) to the terminals (102).

Figure 2:
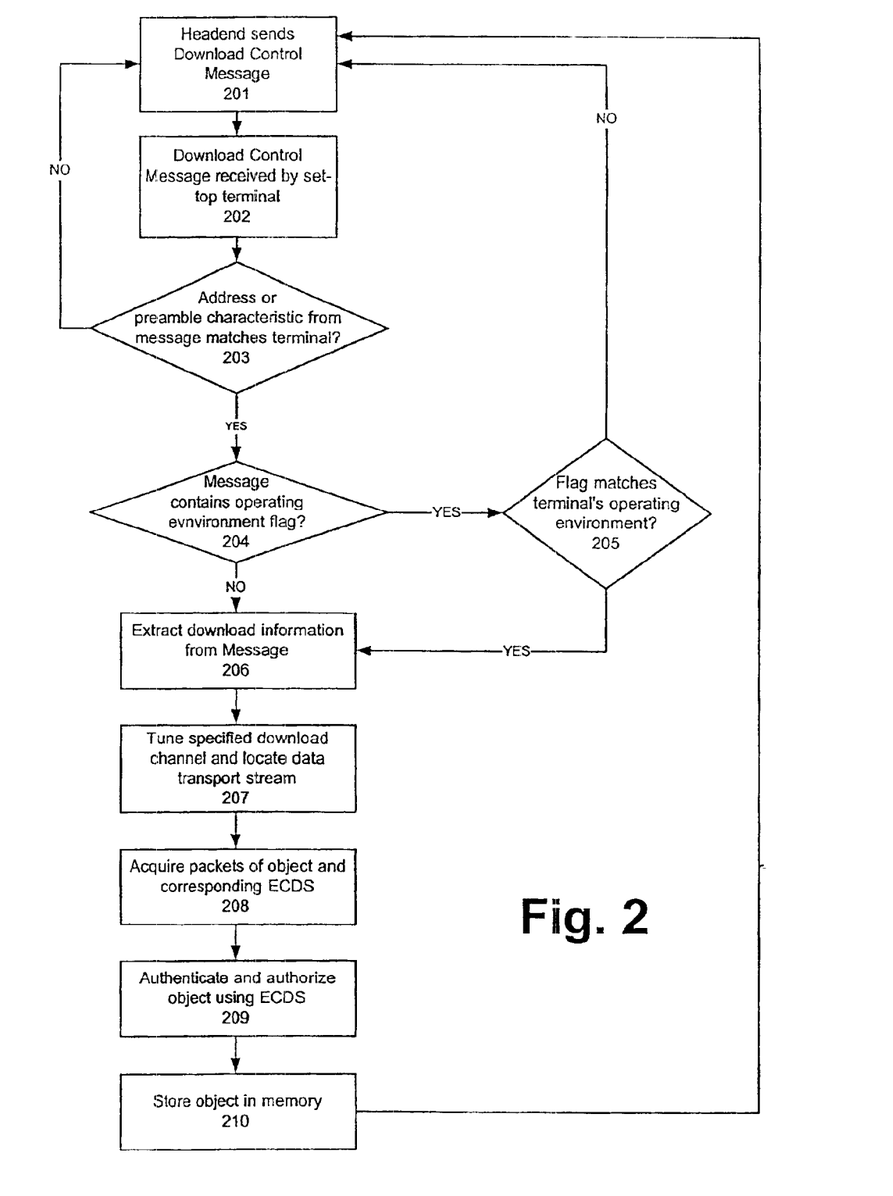
FIG. 2 is a flowchart illustrating operation of the system of the present invention using the Download Control Message of the present invention.

Referring to FIG. 2, this method of the present invention for controlling the downloading of code objects by set-top terminals (102) within a cable television system is illustrated. As shown in FIG. 2, the headend (101) sends a Download Control Message (201) according to the present invention. This Message is received (202) by the set-top terminals (102) in the system.

Within the network (103), each set-top terminal (102) may have a specific address and one or more multi-cast addresses such that the headend (101) can direct messages to specific set-top terminals or to defined groups of terminals sharing a particular multi-cast address. Alternatively, a message can be directed to a particular group of terminals using a preamble characteristic (i.e. distinguishing information within the system or set-top that can be appended to a message causing specific set-top terminals to accept and implement that message). The message is ignored by set-top terminals not having the specified preamble characteristic.

Within the scope of the present invention, the Download Control Message may be broadcast to all set-top terminals (102) within the network, multi-cast to a particular group of terminals (e.g., 102A and 102B) or single-cast to a particular terminal (e.g., 102A). In this way, the service provider can target upgraded programming to only that class or classes of set-top terminals (102) needing the upgrade. This allows the service provider to account for differences between types and installation dates of the terminals (102) connected to the system (103).

As shown in FIG. 2, when a Download Control Message is received by a set-top terminal (102), the processor (I 11) of the terminal (102) will check the address or preamble characteristics associated with the Message against the single- or multi-cast addresses, or preamble characteristics, assigned to that terminal. (203). If the address or preamble characteristics of the Message match the terminal, the terminal (102) will accept and implement the Download Control Message. Otherwise, the Message is ignored by the terminal (102).

The Message may also contain an operating environment flag. This flag will specify, for example, the operating environment of the set-top terminal in which the Download Control Message will be accepted and executed by the set-top terminal (102) based purely on the object class of the object to be acquired, e.g., whether the object is a platform or system object. If the flag is set to "any" environment (which is the default setting), then the set-top terminal (102) will accept and execute the instructions of the Message regardless of whether the set-top terminal (102) is operating in either the platform object or system object environment.

If the flag is set to "platform object," the set-top terminal (102) will only accept and execute the Download Control Message if a platform object is running on and in control of the set-top terminal (102). Alternatively, if the flag is set to "system object," the set-top terminal (102) will only accept and execute the Download Control Message if a system object is running on and in control of the set-top terminal (102). As will be understood by those skilled in the art, a system object is an operating system object which, when running, allows the set-top terminal to acquire and execute additional applications that provide advanced services to the subscriber. A platform object is a more basic code object that is typically run by the set-top terminal prior to acquiring or starting the operating system and which may allow the set-top terminal to provide only basic services.

As shown in FIG. 2, the set-top terminal (102) receiving a Download Control Message will check the Message for an operating environment flag (204). If a flag is found, the terminal (102) will determine if its operating environment matches (205) the designation of the flag, i.e., all (automatic match), system or platform. If the operating environment flag is not present, is set to "all" or matches the actual operating environment of the set-top terminal, the terminal (102) will proceed to accept and execute the instructions of the Download Control Message.

The information necessary to download a specified code or data object is extracted from the Download Control Message (206) by the processor (111) of the set-top terminal (102). The Download Control Message of the present invention provides all the information necessary to allow the set-top terminal (102) to instantly begin acquisition of a specified programming object. For example, the Download Control Message identifies for the set-top terminal (102) the identity and location of each listed code object and its corresponding entitlement control data structure (ECDS). The ECDS is a data structure transmitted or stored separately from its corresponding code object that contains information about the code object used to authorize and authenticate the code object.

To specify the location of a code object or its ECDS, the Download Control Message specifies the channel or frequency of the transport stream, in-band or out-of-band, at which the packets for the code object or ECDS are being transmitted, and perhaps carouseled with the packets of other data objects. Each set-top terminal (102) includes a tuner (110) controlled by the terminal's processor (111) that can be used to tune any transport stream specified by the Download Control Message as carrying the object to be acquired. The set-top terminal (102) then tunes to that transport stream (207). The Download Control Message may also specify the PID of the packets carrying the code object or ECDS to be acquired. The set-top terminal (102) can then acquire all the packets with that PID number and reassemble the collected data into the desired programming code object or its ECDS (208).

Additionally, in some areas, local cable systems operate with virtual channels requiring multiple channel maps. Consequently, the Download Control Message of the present invention may include a virtual channel identification field to allow for proper specification of the location of a data stream providing the packets of an object or its ECDS to be downloaded in such a virtual channel system.

Figure 2A:
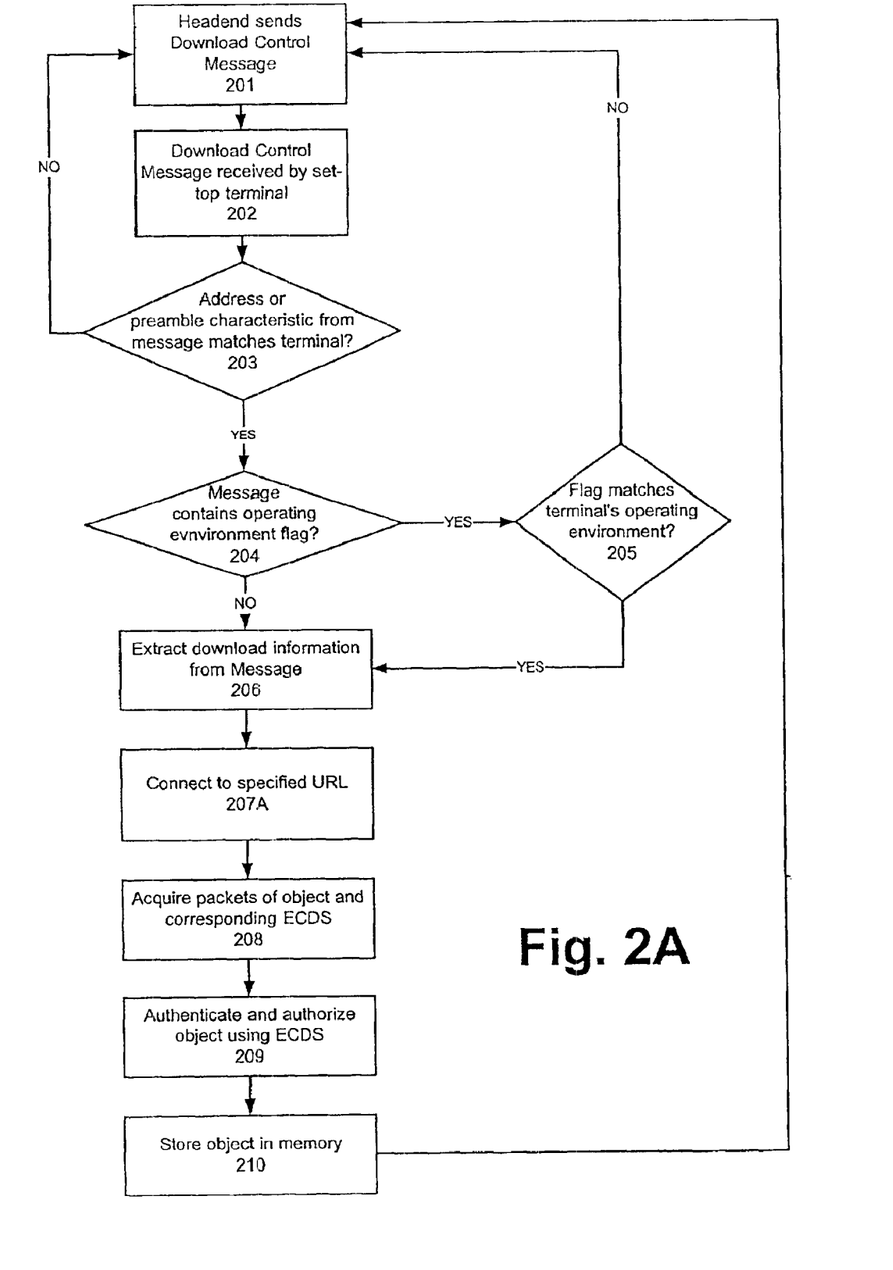
FIG. 2A is a flowchart illustrating operation of a second embodiment of the system of the present invention using the Download Control Message of the present invention.

Alternatively, as shown in FIG. 2A, the cable network (103) may be organized as computer network using URLs or universal resource locators to specify the address of downloadable code objects. Consequently, the Download Control Message may specify the location of a listed code object and its corresponding ECDS by URL for download by the set-top terminal (102). Consequently, the set-top terminal (102) can address the specified URL (207A) and acquire the desired code object or corresponding ECDS (208).

The ECDS may be on a different data transport stream requiring the terminal (102) to tune a different channel in order to acquire it. Alternatively, the ECDS may reside at a different URL than the corresponding code object. Thus, the set-top terminal (102) may have to address a second URL to acquire the ECDS. The necessary data to locate the ECDS is, as noted, included in the Download Control Message of the present invention.

Using the data of the ECDS, the set-top terminal (102) can verify that it has downloaded the appropriate code object and that the code object has been received correctly without inadvertent or malicious alteration (209). It is obviously important for the set-top terminal (102) to be able to authenticate and authorize the received code object before that object is executed by the set-top terminal (102). The ECDS may also specify a valid time period or lifetime for the corresponding code object.

The Download Control Message of the present invention also contains information about the size and nature of the object to be downloaded. This information corresponds to the information conventionally provided in segment 0 of the object when the object is packetized for transmission. Consequently, the Download Control Message of the present invention gives the set-top terminal (102) the data required to control the download of the object so that the terminal (102) need not wait for a transmission of segment 0 of the object before beginning the download. The terminal (102) can begin collecting any packets or segments identified as belonging to the object being downloaded immediately. The collection continues until all the packets are acquired and can be reassembled into the desired object. By way of example, the terminal (102) may begin by receiving packet 50 of 100, collect packets 51 to 100, then collect packets 0 to 49 and reassemble the object. The terminal (102) need not wait for any particular point in the carousel of packets before beginning acquisition.

This occasions another modification in the system of the present invention. Under conventional systems, set-top terminals would implement a timer to record the length of time waiting to receive segment 0 of an object to be downloaded. When a predetermined period of time elapsed without the arrival of segment 0, the timer could be used to "time-out" or terminate the attempted acquisition of the data object. This timeout feature prevents the set-top terminal from continuing to indefinitely devote resources to the download of the designated object when, for whatever reason, the object is not being broadcast or the terminal is no long receiving the data stream on which the object is being carouseled.

Figure 3:
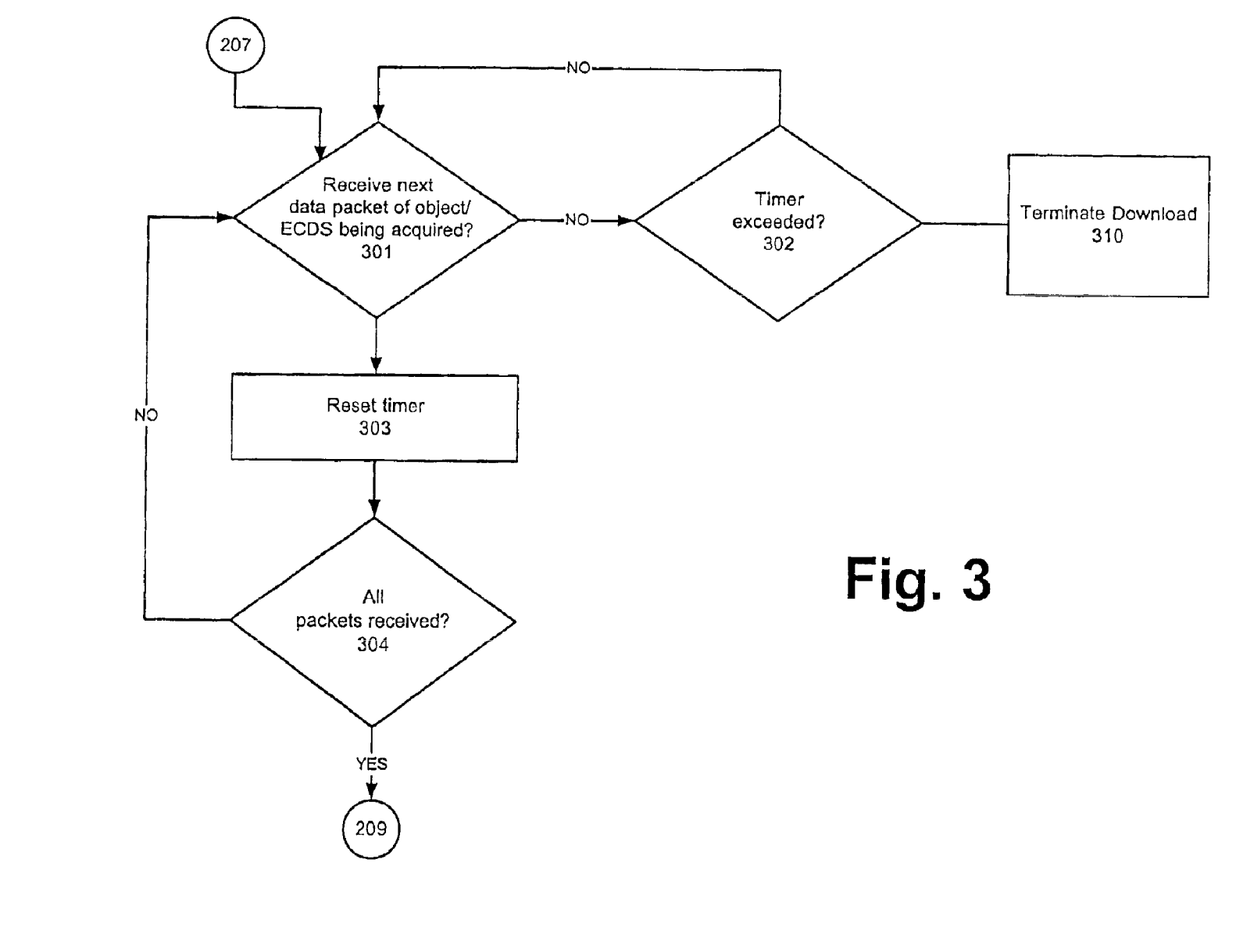
FIG. 3 is a flowchart further detailing the actual downloading step of FIGS. 2 and 2A according to the present invention.

In the present invention, as shown in FIG. 3, a timer is configured to measure the elapsed time between acquisition of sequential segments or packets of the object being downloaded. This is important because the terminal (102), under the present invention, need no longer begin the download by waiting to acquire segment 0.

Consequently, if more than a predetermined period of time elapses between the reception of segments of the object, the terminal (102) will assume that the transmission of the object has been discontinued or otherwise interrupted and will cease trying to acquire the object. The processor (111; FIG. 1) can contain, operate and reset the timer as needed.

As shown in FIG. 3, after the specified data transport stream has been tuned (207) or the appropriate URL addressed (207A), the terminal (102) waits to receive the first or next data packet of either the code object being downloaded or its ECDS. When a packet is received (301), the timer is reset (303). If no next data packet is received, the terminal (102) check to see if the timer has exceeded a specified time-out limit (302). If the timer has exceeded the limit, the download is terminated (310). If the timer has not exceeded the predetermined limit, the terminal (102) continues to wait for the next data packet (301) and monitor the timer (302).

After a data packet is received, the terminal (102) determines if all packets have been received (304). If not, the terminal (102) continues to wait for the next data packet (301) and monitors the timer (302). If all the packets of the object have been acquired, the terminal (102) may then acquire the packets of the ECDS. This may requiring tuning a new data transport stream or contacting a new URL before the terminal (102) resumes waiting to receive the next data packet (301). When all the packets of the object and its ECDS have been acquired, the processes passes back to step (209) in which the downloaded code object is authorized and authenticated using the ECDS.

After the object is authorized and authenticated, the object is stored (210) in memory (112) for future use by the terminal (102). Additionally, the Download Control Message of the present invention may provide an instruction as to how the object being acquired is to be stored in memory (112), for example, volatile memory, non-volatile memory or "any." The Download Control Message of the present invention may also specify, if the object is to be eventually located in Flash memory, whether the object must be located absolutely at a particular address within Flash memory. For example, in a related patent application U.S. Ser. No. 60/130,328, a novel architecture is described in which the base platform code object and the operating system code object must be located at specific stack points within the Flash memory. When downloading such an object, the Download Control Message of the present invention can specify that an object must be stored at a particular location within the memory (112).

For each object that the Download Control Message directs the set-top terminal (102) to acquire, the following information should be provided in the Message: (1) the name of the object, preferably in ASCII text; (2) the version of the object; (3) the storage classification of the object, e.g., volatile memory, non-volatile memory, doesn't matter, etc.; and (4) the object size, preferably the ROMMABLE size (in bytes) of the encapsulated object not including the size of the static variable required for operation of the code object.

Additionally, in a preferred embodiment, the Download Control Message of the present invention preferably also includes the following information:

(1) Operating environment flag: This flag indicates the operating environment in which the Download Control Message will be executed by the set-top terminal (102) based purely on the object class of the object to be acquired, e.g., whether the object is a platform or system object. If the flag is set to "any" environment (which is the default setting), then the message will execute in either the platform object or system object environment. If the flag is set to "platform object", then the message will only execute in the platform object environment, and if the flag is set to "system object", then the message will only execute in the system object environment.

(2) Auto purge enable flag: This one-bit flag indicates whether the set-top terminal (102) is to purge from its memory (112) any older versions of the object or objects that are to be acquired in response to the Download Control Message. In other words, the auto purge enable flag can be used to direct the set-top terminal (102) to delete from memory (112) any object which is specified as an object to be acquired in the Download Control Message which also has a version number different from that specified in the Download Control Message for the object to be acquired.

(3) Auto list enable flag: This one-bit flag indicated whether the set-top terminal (102) is to automatically enable the entire list of objects in the Download Control Message after the successful acquisition of all objects listed in the message. Note that for the managed object type, "enable" means marking the file directory flag as enabled. It will be the responsibility of the App O/S to start the execution of the code object.

(4) Timeout field enable flag: This one-bit flag indicates whether a limit for the inter-segment timer and list enable timer are specified within the Download Control Message. If the timeout field enable flag is not set, default values are used for both the inter-segment and list enable timers. If the tune download function is specified to be other than "conditionally tune," this flag should be set to zero and will be ignored by the set-top terminal (102).

(5) Tune download function field: This field is used to specify whether the set-top terminal (102) is to tune to the specified download channel only if the set-top terminal (102) has not yet acquired the specified version of the code object. Once the set-top terminal (102) has acquired and activated the specified version of the code object, it must autonomously detune the channel (free up the control channel packet processor). In response to a "conditional tune" subcommand in the tune download function field, the set-top terminal (102) need only acquire the object or objects specified in the Download Control Message. The set-top terminal (102) need not acquire any other code object that may be transported in the PID stream except as specified in the Message.

(6) Sequence number: This field indicates when a change has occurred in the Download Control Message. For example, if a Download Control Message is received with auto enable not activated, the set-top terminal (102) will download all specified code objects, but it will not enable the objects. Rather, the terminal (102) waits for subsequent Download Control Message containing the same list and version of objects to be acquired with the auto enable flag set. The sequence number field would be used to indicate that the Message had changed, and that the set-top terminal (102) should process the Message.

(7) List identification field: This field is used to identify a list of code objects so that operations may be performed on the list as opposed to individually on each object in the list. An object that was previously loaded in the set-top terminal (102) with the same list identifier as in the current Download Control Message, but not included on the current list, will be deleted from the set-top along with its associated Object Conditional Access Message (OCAM) information.

(8) List version field: This field is used to identify the version of the list in the Download Control Message. Together, the list identification field and the list version field will identify duplicate Download Control Message, essentially functioning as a sequence number. The list version must change whenever anything in the Download Control Message changes including the tune download function field, any object information in the list, and inter-segment and list enable timer information.

(9) Number of objects field: This field indicates the number of code objects in the list to be acquired in response to the Download Control Message.

(10) VCT Identification field: This field specifies the identity of the VCT that is applicable to the Download Control Message. A VCT identifier of "00 00" can be used when a download channel is defined across multiple VCT identifications (i.e., multiple headends). In this case, a home VCT identifier (as configured by the headend) will not be verified by the set-top terminal's downloader software before attempting to download the specified object or objects over the download channel information given in the Download Control Message.

(11) Download channel field: This field specifies the channel that the set-top terminal (102) should tune to acquire the download object or objects specified in the Download Control Message. The download channel field provides the reference from which the download PID may be determined. The download channel field may refer to an entry in the Virtual Channel Table (VCT). From that table, the download PID specifying the packets of the object to be acquired can be determined.

(12) Relocatable code flag: This flag indicates whether the code object may or may not be relocated in Flash as part of de-fragmentation later in the lifetime of the set-top terminal (102). Note that all managed objects must be relocatable. Platform objects and system objects may or may not be relocatable.

(13) Absolute address field: This field can specify the physical address where the downloaded code object will be loaded. Only a platform object or a system object may have an absolute physical address.

(14) Object identifier field: This field provides a unique identifier for the object or objects to be acquired by the set-top terminal (102) in response to the Download Control Message.

(15) Object class field: This field provides an enumerated definition of the type of the code object identified for download. For example, the object may be a platform object. A platform object is a program that runs on and controls the set-top terminal (102) in the absence of an executing operating system (O/S). Typically, a platform object provides the set-top terminal (102) with only basic functionality such as receiving television signals. The platform object should also enable the set-top terminal (102) to authorize, receive, authenticate and implement an operating system. Alternatively, the object may be a system object, i.e., an operating system (O/S) for the set-top terminal, or an application or managed object which is a program that runs under the operating system to provide additional features for the set-top terminal such as e-mail or an electronic program guide.

(16) Table extension field: This field is used by the decoder to differentiate between various message images that may be present simultaneously on the transport multiplexed data stream for one message type. It is the same table extension value found in each private message header for segmented messages. The download object header itself is found only in segment 0 of the message. By carrying the table extension in the Download Control Message, the set-top terminal (102) is able to begin downloading the object on the first segment received (any segment of the object). Moreover, it is not necessary to repeat segment 0 throughout the message. If there is only one object per download PID, the table extension field may be set to zero. In this case, the downloader will acquire all segments on the given download PD.

(17) Inter-segment timer field: This field provides information for the first of two watchdog timers that may be used with a conditional tune subcommand. The inter-segment timer tracks the elapsed time before the reception of the first and each successive segment of the code object being downloaded. Reception of the first code segment represents the real start of object acquisition and insures that the download is proceeding—i.e., another segment of the download message is received within the specified time limit. If the timer expires before the next segment is received, then the download is aborted. Note that the time to receive the first segment is measured from the receipt of the Download Control Message, including time to authorize the list of objects. This field may specify a time limit to be used by the inter-segment timer or may direct the timer to use a pre-specified default time limit.

(18) List enable timer field: This field provides information for the second watchdog timer that may be used with a conditional tune subcommand. This timer tracks the reception of the ENABLE subcommand for the target object(s) that marks the completion of object acquisition and initiation. This timer will be used to hold the download stream open until all "enables" for all objects have been received. If the timer expires before the list enables are received, then the download is aborted. If the auto-enable flag is set, this timer sets the time limit to receive all objects in the object list. Again, this field may specify a time limit to be used by the inter-segment timer or may direct the timer to use a pre-specified default time limit.

The preceding description is merely exemplary and is not intended to limit the scope of the present invention. Those of skill in the art will recognize various modifications and ramifications of the principles of the present invention as described herein. All such details are encompassed by the present invention.

What is claimed is:

1. A method of controlling the downloading of code and data objects by a set-top terminal in a cable television system, the method comprising:

transmitting a download control message to said set-top terminal, wherein said download control message specifies an object to be downloaded, a ROMable size of said object and a location of said object such that said set-top terminal is enabled to commence downloading said object upon receipt of said download control message;

specifying, with said download control message, an operating environment of said set-top terminal in which said terminal is to respond to said download control message; and downloading said object in accordance with said download control message only if said set-top terminal is in said operating environment specified by said download control message;

wherein said operating environment is determined by whether said set-top terminal is executing and controlled by a platform object or a system object.

2. A system for controlling the downloading of code and data objects by a set-top terminal in a cable television system, the system comprising:

a set-top terminal connected to a cable television system; and means for transmitting a download control message to said set-top terminal;

wherein said download control message specifies an object to be downloaded, a size of said object such that said set-top terminal is enabled to commence downloading said object upon receipt of said download control message;

wherein said code or data object is added to firmware of said set-top terminal;

wherein said download control message further specifies an operating environment of said set-top terminal in which said terminal is to respond to said download control message;

wherein said set-top terminal will download said object in accordance with said download control message only if said set-top terminal is in said operating environment specified by said download control message; and wherein said operating environment is determined by whether said set-top terminal is executing and controlled by a platform object or a system object.

* * * * *